(12) United States Patent
Nakamura (10) Patent No.: US 9,220,102 B2
(45) Date of Patent: Dec. 22, 2015

(54) LOW POWER BASE STATION AND COMMUNICATION CONTROL METHOD

(75) Inventor: Kazutaka Nakamura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 524 days.

(21) Appl. No.: 13/579,012

(22) PCT Filed: Feb. 15, 2011

(86) PCT No.: PCT/JP2011/053146
§ 371 (c)(1),
(2), (4) Date: Aug. 14, 2012

(87) PCT Pub. No.: WO2011/099623
PCT Pub. Date: Aug. 18, 2011

(65) Prior Publication Data
US 2012/0329470 A1    Dec. 27, 2012

(30) Foreign Application Priority Data

Feb. 15, 2010    (JP) ................. 2010-030424

(51) Int. Cl.
*H04W 72/04* (2009.01)
*H04W 84/04* (2009.01)
*H04W 72/08* (2009.01)

(52) U.S. Cl.
CPC ........ *H04W 72/0453* (2013.01); *H04W 72/082* (2013.01); *H04W 84/045* (2013.01)

(58) Field of Classification Search
CPC ... H04W 16/10; H04W 52/40; H04W 84/045; H04W 16/14; H04W 16/32; H04W 24/02; H04W 28/16; H04W 72/02; H04W 72/08; H04W 72/082; H04W 84/12; H04W 88/08

USPC ................................ 455/63.1–63.3
See application file for complete search history.

(56) References Cited

U.S. PATENT DOCUMENTS 6,101,176 A * 8/2000 Honkasalo et al. ........... 370/335
6,453,166 B1 * 9/2002 Ishikawa et al. ............. 455/450
7,606,193 B2 * 10/2009 McFarland et al. .......... 370/329

(Continued)

FOREIGN PATENT DOCUMENTS

CN    1256058 A    6/2000
EP    2136593 A2    12/2009

(Continued)

OTHER PUBLICATIONS

NTT DOCOMO et al.; Study on Enhanced Interference Management Mechanisms for HNB; 3GPP TSG-RAN3#65; R3-091894; Aug. 24-28, 2009; Shenzhen, CN.

(Continued)

*Primary Examiner* — Matthew Sams
(74) *Attorney, Agent, or Firm* — Studebaker & Brackett PC (57) ABSTRACT

In the case where the disclosed low-power base station (300) detects a macro terminal (200), which is a wireless terminal that is not subordinate to said low-power base station (300), when the macro terminal (200) is present in the vicinity of the low-power base station (300) and the low-power base station (300) allocates femto downlink bands as-is to a femto terminal (400), which is a subordinate wireless terminal, the low-power base station (300) considers that interference is applied to the macro terminal (200), and limits the femto downlink bands that are allocated.

5 Claims, 4 Drawing Sheets

(56) References Cited

U.S. PATENT DOCUMENTS

| | | | |
|---|---|---|---|
| 8,144,654 B2* | 3/2012 | Imai | 370/329 |
| 8,340,580 B1* | 12/2012 | Epstein | 455/63.1 |
| 8,583,124 B2* | 11/2013 | Nagato et al. | 455/444 |
| 8,615,266 B2* | 12/2013 | Bonneville et al. | 455/522 |
| 8,666,391 B2* | 3/2014 | Duan | 455/424 |
| 2005/0043047 A1* | 2/2005 | Vigier et al. | 455/509 |
| 2005/0190701 A1* | 9/2005 | Bejerano et al. | 370/252 |
| 2007/0076657 A1* | 4/2007 | Woodings et al. | 370/329 |
| 2007/0270151 A1* | 11/2007 | Claussen et al. | 455/444 |
| 2008/0004000 A1* | 1/2008 | Boss et al. | 455/423 |
| 2009/0109939 A1* | 4/2009 | Bhushan et al. | 370/337 |
| 2009/0175324 A1* | 7/2009 | Sampath et al. | 375/222 |
| 2009/0318182 A1 | 12/2009 | Nagato et al. | |
| 2010/0087203 A1* | 4/2010 | Lee et al. | 455/452.2 |
| 2010/0113026 A1* | 5/2010 | Narasimha et al. | 455/436 |
| 2010/0136996 A1* | 6/2010 | Han et al. | 455/452.1 |
| 2010/0144317 A1* | 6/2010 | Jung et al. | 455/411 |
| 2010/0254344 A1* | 10/2010 | Wei et al. | 370/330 |
| 2010/0265918 A1* | 10/2010 | Marinier et al. | 370/332 |
| 2010/0290414 A1* | 11/2010 | Yamada | 370/329 |
| 2011/0003597 A1* | 1/2011 | Budic et al. | 455/450 |
| 2011/0013600 A1* | 1/2011 | Kim et al. | 370/332 |
| 2011/0086651 A1* | 4/2011 | Li et al. | 455/501 |
| 2011/0116480 A1* | 5/2011 | Li et al. | 370/332 |
| 2012/0052899 A1* | 3/2012 | Wang et al. | 455/513 |
| 2012/0142339 A1 | 6/2012 | Duan | |
| 2012/0142364 A1* | 6/2012 | Duan | 455/450 |
| 2012/0243630 A1* | 9/2012 | Golovins | 375/260 |

FOREIGN PATENT DOCUMENTS

| | | |
|---|---|---|
| JP | 2011-166223 A | 8/2011 |
| WO | 2011/021387 A1 | 2/2011 |
| WO | 2011/021389 A1 | 2/2011 |

OTHER PUBLICATIONS

3GPP TR 25.967 8.0.1 (Mar. 2009); 3rd Generation Partnership Project; Technical Specification Group Radio Access Networks; Home Node B Radio Frequency (RF) Requirements (FDD) (Release 8).

International Search Report; PCT/JP2011/053146; May 24, 2011.

An Office Action issued by the Korean Patent Office on Nov. 8, 2013, which corresponds to Korean Patent Application No. 10-2012-7021862 and is related to U.S. Appl. No. 13/579,012; with English language statement of relevance.

Ericsson; "On CSI RS Design"; 3GPP TSG-RAN WG1 #59bis; R1-100048; Valencia, Spain; Jan. 18-22, 2010.

An Office Action; "Notice of Reasons for Rejection," issued by the Japanese Patent Office on Aug. 20, 2013, which corresponds to Japanese Patent Application No. 2011-553915 and is related to U.S. Appl. No. 13/579,012; with statement of relevance.

The first Office Action issued by the Chinese Patent Office on May 30, 2014, which corresponds to Chinese Patent Application No. 201180009601.3 and is related to U.S. Appl. No. 13/579,012; with English language concise explanation.

\* cited by examiner

LOW POWER BASE STATION AND COMMUNICATION CONTROL METHOD

TECHNICAL FIELD

The present invention relates to a low power base station that constitutes a radio communication system together with a high power base station and has transmission power smaller than that of the high power base station, and a communication control method in the low power base station.

BACKGROUND ART

As the next-generation radio communication system for performing higher speed communication with higher capacity, as compared with the 3rd-generation and 3.5th-generation radio communication systems operated at present, an LTE has been standardized by 3GPP, which is a group aiming to standardize a radio communication system. The technical specifications of the LTE have been specified as 3GPP Release 8, and Release 9, which is an upgrade version of Release 8, and an LTE Advanced, which is a sophisticated version of the LTE, have been currently considered.

Furthermore, in the LTE Release 9, detailed functions and requirements of a low power base station (Home eNodeB) have been standardized, which forms a cell (called a small cell) having a small transmission power and being a communication area having a radius in the range from about several [m] to about ten-odd [m] and is a small base station installable in an indoor space. The low power base station is installed in order to distribute traffic of a high power base station (Macro eNodeB), which has transmission power higher than that of the low power base station and forms a cell (a large cell) being a communication area having a radius of about several hundred [m], or to cover a dead zone in the large cell. The configuration of such a radio communication system is called a heterogeneous environment.

PRIOR ART DOCUMENT

Patent Document

[NPL 1] 3GPP TR25.967, "Home Node B Radio Frequency (RF) Requirements (FDD)", clause 7.2, "Control of HNB downlink interference", March, 2009

SUMMARY OF THE INVENTION

Meanwhile, when the low power base station is installed in the large cell, downlink radio communication from the low power base station to a radio terminal subordinate to the low power base station may cause interference to a radio terminal subordinate to the high power base station. Therefore, it is necessary to reduce the interference.

Therefore, it is an object of the present invention to provide a low power base station and a communication control method, which is possible to appropriately reduce interference to a radio terminal subordinate to a high power base station.

To solve the above problem, the present invention has following features. A first feature of the present invention is summarized as a low power base station (low power base station 300), which configures a radio communication system (radio communication system 1) together with a high power base station (high power base station 100) and has transmission power smaller than the high power base station, comprising: a band limitation unit (femto downlink band limitation unit 324) configured to limit a downlink frequency band to be assigned to radio terminals (femto terminals 400) subordinate to the low power base station when radio terminals (macro terminals 200) not subordinate to the low power base station have been detected.

When radio terminals not subordinate to the low power base station have been detected, if the radio terminals not subordinate to the low power base station exist around the low power base station and downlink frequency band is assigned to radio terminals subordinate to the low power base station, the low power base station regards that the radio terminals not subordinate to the low power base station are interfered and limits the assigned downlink frequency band. Consequently, it is possible to appropriately reduce interference to the radio terminals subordinate to the high power base station from the low power base station.

A second feature of the present invention is summarized as that the band limitation unit adjusts a bandwidth where the assignment is limited, according to the number of the detected radio terminals not subordinate to the low power base station.

A third feature of the present invention is summarized as that the band limitation unit increases the bandwidth where the assignment is limited, as the number of the detected radio terminals not subordinate to the low power base station is larger.

A fourth feature of the present invention is summarized as that the band limitation unit adjusts the bandwidth where the assignment is limited, according to the number of the radio terminals subordinate to the low power base station.

A fifth feature of the present invention is summarized as that the band limitation unit reduces the bandwidth where the assignment is limited, as the number of the radio terminals subordinate to the low power base station is larger.

A sixth feature of the present invention is summarized as that the band limitation unit adjusts the bandwidth where the assignment is limited, based on information indicating propagation loss between the low power base station and the high power base station.

A seventh feature of the present invention is summarized as that the band limitation unit increases the bandwidth where the assignment is limited, as propagation loss corresponding to the information indicating the propagation loss is larger.

An eighth feature of the present invention is summarized as that a communication control method in a low power base station, which configures a radio communication system together with a high power base station and has transmission power smaller than transmission power of the high power base station, comprising: a step of limiting a downlink frequency band to be assigned to radio terminals subordinate to the low power base station when radio terminals not subordinate to the low power base station have been detected.

According to the present invention, it is possible to appropriately reduce interference to a radio terminal subordinate to a high power base station.

MODES FOR CARRYING OUT THE INVENTION

Next, an embodiment of the present invention will be described with reference to the drawings. Specifically, the embodiment of the present invention will be described in sequence of (1) Configuration of radio communication system, (2) Operation of low power base station, (3) Operation and effect, and (4) Other embodiments. It is to be noted that the same or similar reference numerals are applied to the same or similar parts through the drawings in the following embodiments.

Figure 1:
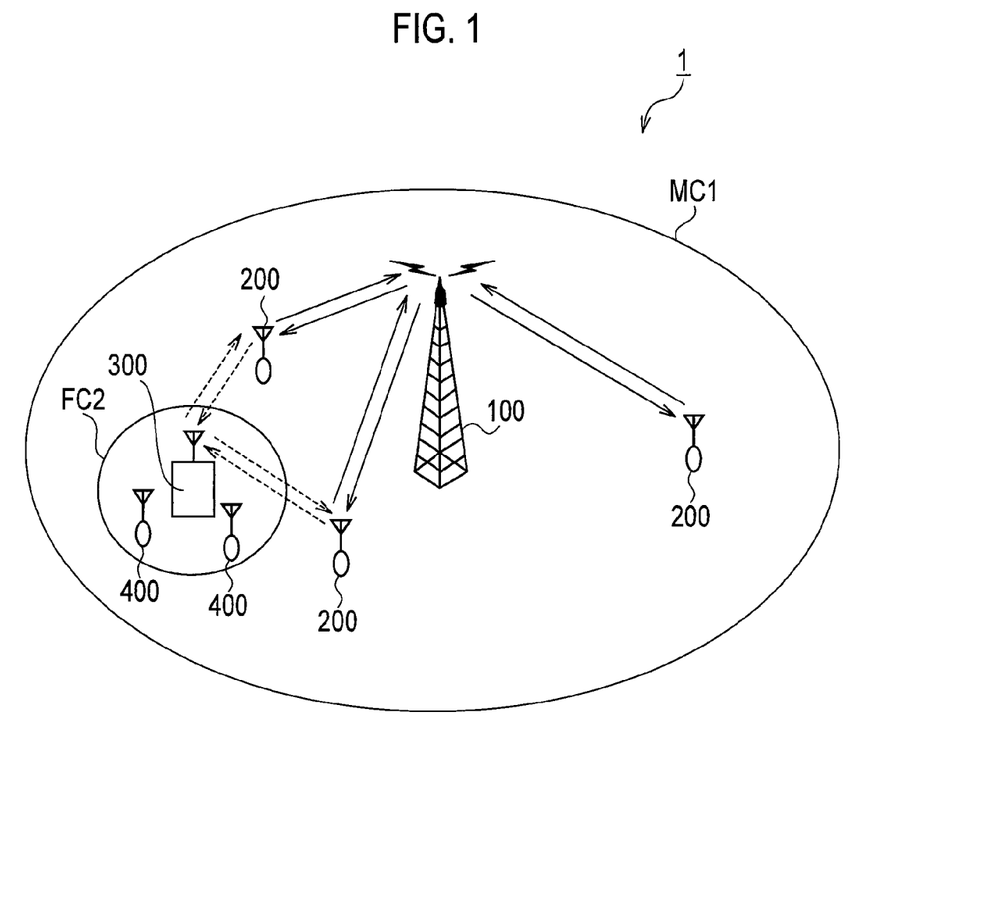
FIG. 1 is a diagram showing the entire schematic configuration of a radio communication system according to an embodiment of the present invention.

(1) Configuration of Radio Communication System
(1.1) Entire Schematic Configuration of Radio Communication System FIG. 1 is a diagram showing the entire schematic configuration of a radio communication system 1 according to an embodiment of the present invention. The radio communication system 1, for example, has a configuration based on the LTE Release 9 which is a 3.9th-generation (3.9G) cellular phone system, or the LTE-Advanced positioned as a 4th-generation (4G) cellular phone system.

As shown in FIG. 1, the radio communication system 1 includes a high power base station (a high output power base station, a large output base station) (for example, a macro cell base station) 100, which forms a large cell (for example, a macro cell) MC1, and a low power base station (a low output power base station, a small output base station) (for example, a femto cell base station: HeNB)) 300, which has transmission power smaller than that of the high power base station 100 and forms a small cell (for example, a femto cell) FC2. A radius of the large cell MC1, for example, is about several hundred [m] and a radius of the small cell FC2, for example, is in the range from about several [m] to about ten-odd [m].

In an area subordinate to the high power base station 100, in other words, in the large cell MC1 and outside the small cell FC2, radio terminals 200 exist. It is possible for the high power base station 100 and the radio terminals 200 to perform radio communication with each other. Furthermore, in an area subordinate to the low power base station 300, in other words, in the small cell FC2, radio terminals 400 exist. It is possible for the low power base station 300 and the radio terminals 400 to perform radio communication with each other. Hereinafter, the radio terminals 200 will be referred to as macro terminals 200 and the radio terminals 400 will be referred to as femto terminals 400.

The high power base station 100 is installed at a place based on a cell site design in which a communication provider has considered inter-cell interference. Meanwhile, the low power base station 300 is configured in a small size enough to be installed at an arbitrary place (specifically, in an indoor space) by a user. The low power base station 300 is installed in the large cell MC1 in order to distribute traffic of the high power base station 100, or to cover a dead zone in the large cell MC1.

When a frequency band of a downlink (a link from the high power base station 100 to the macro terminals 200, hereinafter, referred to as a "macro downlink"), which is used in radio communication when the high power base station 100 and the macro terminals 200 are connected to perform the radio communication with each other, overlaps a frequency band of a downlink (a link from the low power base station 300 to the femto terminals 400, hereinafter, referred to as a "femto downlink") used in radio communication when the low power base station 300 and the femto terminals 400 are connected to perform the radio communication with each other, the macro terminals 200 performing the radio communication with the high power base station 100 are interfered by a radio signal transmitted from the low power base station 300 to the femto terminals 400 through the femto downlink.

In the present embodiment, the interference to the macro terminals 200 from the low power base station 300 is reduced.

(1.2) Configuration of Low Power Base Station

Figure 2:
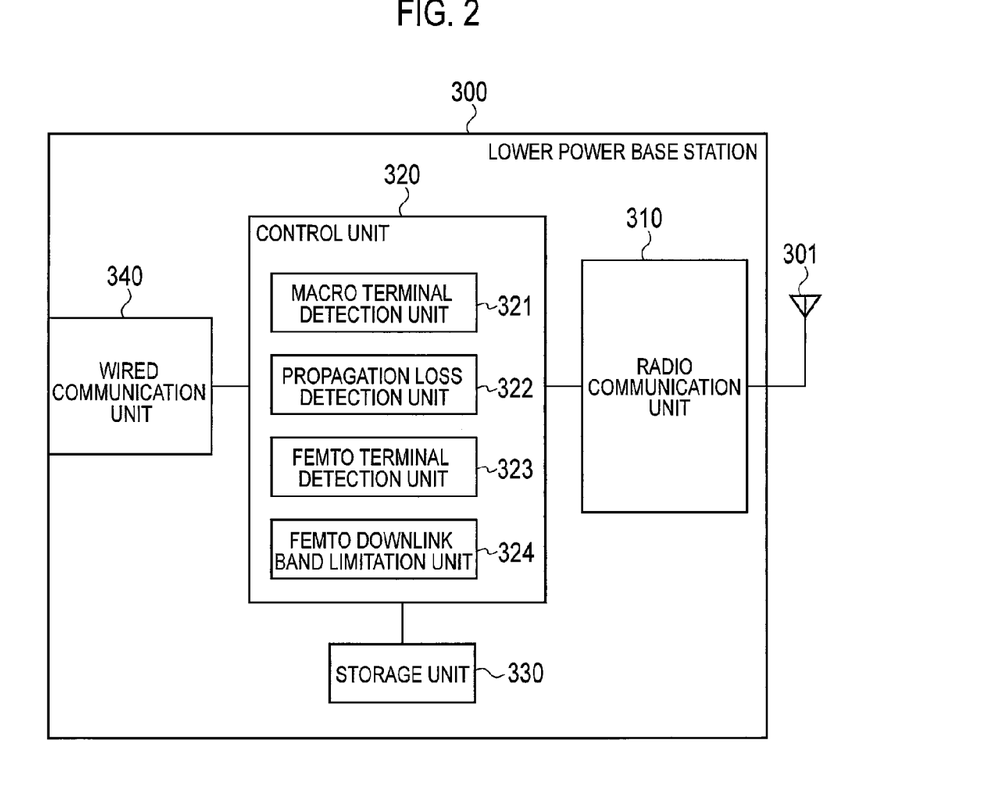
FIG. 2 is a block diagram showing the configuration of a low power base station according to the embodiment of the present invention.

FIG. 2 is a block diagram showing the configuration of the low power base station 300. As shown in FIG. 2, the low power base station 300 includes an antenna unit 301, a radio communication unit 310, a control unit 320, a storage unit 330, and a wired communication unit 340.

The radio communication unit 310, for example, is configured using a radio frequency (RF) circuit, a baseband (BB) circuit, and the like, and transmits/receives a radio signal to/from the femto terminal 400 via the antenna unit 301. Furthermore, the radio communication unit 310 encodes and modulates a transmission signal, and demodulates and decodes a reception signal.

Furthermore, when the high power base station 100 and the macro terminals 200 are connected to perform radio communication with each other using an uplink (a link from the macro terminals 200 to the high power base station 100, hereinafter, referred to as a "macro uplink"), the radio communication unit 310 receives radio signals from the macro terminals 200.

The control unit 320, for example, is configured using a CPU (Central Processing Unit), a DSP (Digital Signal Processor), and the like, and controls various functions of the low power base station 300. The storage unit 330, for example, is configured using a memory, and stores various types of information used for the control and the like of the low power base station 300. The wired communication unit 340 communicates with an exterior via a wired communication network (not shown).

The control unit 320 includes a macro terminal detection unit 321, a propagation loss detection unit 322, a femto terminal detection unit 323, and a femto downlink band limitation unit 324.

The macro terminal detection unit 321 is configured to detect macro terminals 200. Specifically, when the high power base station 100 and the macro terminals 200 perform radio communication with each other using the macro uplink, the macro terminal detection unit 321 detects, from among the macro terminals 200, a macro terminals 200 existing around the low power base station 300 and may be interfered by the low power base station 300.

A technique of detecting the macro terminals 200, the following first and second detection techniques are considered. In the first detection technique, the macro terminal detection unit 321 measures interference amounts in respective frequencies in the entire frequency band of an assignable uplink (a link from the femto terminals 400 to the low power base station 300, hereinafter, referred to as a "femto uplink"). Here, the interference amounts are measured by received intensity of signals from terminals other than the femto terminals 400. Next, when a frequency band, in which the interference amount is equal to or more than a prescribed first predetermined value, exists in the entire frequency band of the femto uplink, the macro terminal detection unit 321 determines that the macro terminals 200 exist.

Furthermore, in the second detection technique, the macro terminal detection unit 321 specifies a radio signal, which includes a pattern of a reference signal other than patterns of reference signals from the femto terminals 400 subordinate to the low power base station 300, among radio signals of a frequency band of the femto uplink which are received in the radio communication unit 310. Here, the pattern of the reference signals from the femto terminal 400 has been prescribed and is recognizable by the macro terminal detection unit 321. Next, the macro terminal detection unit 321 measures received electric field intensity (RSRP) of the radio signal including the pattern of the reference signal other than the pattern of the reference signals from the femto terminal 400, and determines that the macro terminals 200 exist when the received electric field intensity (RSRP) is equal to or more than a prescribed second predetermined value. In addition, the detection technique of the macro terminals 200 is limited to the aforementioned first and second detection techniques.

When the macro terminals 200 have been detected, then, the macro terminal detection unit 321 estimates the number of the detected macro terminals 200. Specifically, when the macro terminals 200 have been detected by the aforementioned first detection technique, the macro terminal detection unit 321 regards the number of the macro terminals 200 to be larger as the ratio of the frequency band, in which the interference amount is equal to or more than the prescribed first predetermined value, to the entire frequency band of the femto uplink is higher, and estimates the number of the macro terminals 200.

Furthermore, when the macro terminals 200 have been detected by the aforementioned second detection technique, the macro terminal detection unit 321 estimates the number of radio signals, which include the pattern of the reference signal other than the pattern of the reference signals from the femto terminal 400, as the number of the macro terminals 200, wherein the received electric field intensity (RSRP) of the radio signals is equal to or more than the second predetermined value.

The propagation loss detection unit 322 detects propagation loss between the high power base station 100 and the low power base station 300. Here, the propagation loss includes distance attenuation, shadowing loss, and feature pass loss.

Specifically, the propagation loss detection unit 322 receives a reference signal, which is transmitted by the high power base station 100 in radio communication using the macro downlink, and a signal including the transmission power of the reference signal, via the antenna unit 301 and the radio communication unit 310. Next, the propagation loss detection unit 322 measures the power (reception power) of the received reference signal. Moreover, the propagation loss detection unit 322 detects the difference between the transmission power and the reception power of the reference signal as propagation loss.

The femto terminal detection unit 323 detects the number of femto terminals 400. For example, it is possible for the femto terminal detection unit 323 to monitor the states of the assignment and release of a frequency band for the femto terminals 400 by the low power base station 300, and to detect the number of the femto terminals 400 based on results of the monitoring.

When the macro terminals 200 have been detected by the macro terminal detection unit 321, the femto downlink band limitation unit 324 limits a frequency band of the femto downlink (hereinafter, referred to as a "femto downlink band"), which is to be assigned to the femto terminals 400, based on the number of the macro terminals 200 detected by the macro terminal detection unit 321, the propagation loss between the high power base station 100 and the low power base station 300 detected by the propagation loss detection unit 322, and the number of the femto terminals 400 detected by the femto terminal detection unit 323.

Figure 3:
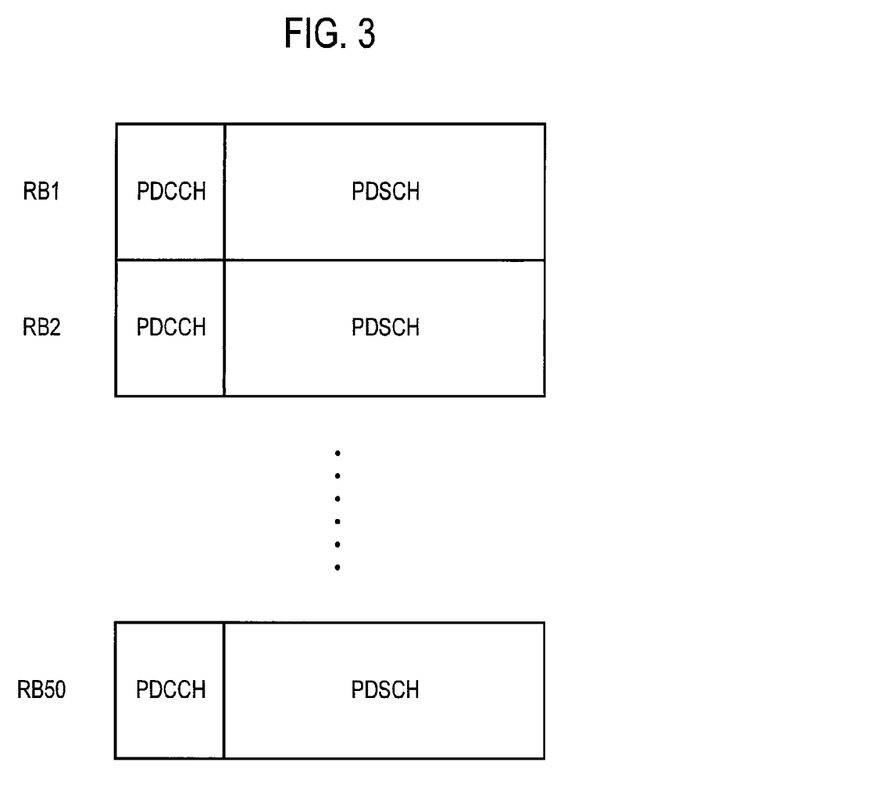
FIG. 3 is a diagram showing an example of a downlink frequency band available to the low power base station according to the embodiment of the present invention.

FIG. 3 is a diagram showing an example of a downlink frequency band available to the low power base station 300. When a downlink frequency bandwidth available to the low power base station 300 is 10 [MHz], the downlink frequency band is divided into 50 resource blocks (RBs) 1 to 50. Each resource block is configured by a control information channel (PDCCH: Physical Downlink Control Channel) for downlink control information transmission and a shared data channel (PDSCH: Physical Downlink Shared Channel) for downlink user data transmission.

The PDCCH includes various types of information required for receiving user data included in the PDSCH. Therefore, when it is not possible for the femto terminal 400 to receive the information in the PDCCH, it is not possible to receive the user data in the PDSCH. Accordingly, the PDCCH is an important radio channel, and as such, the assignment cannot be limited. Therefore, in the present embodiment, the femto downlink band limitation unit 324 employs the PDSCH as the femto downlink band and limits the assignment.

As the number of the detected macro terminals 200 is larger, it becomes more probable that the low power base station 300 causes interference to the macro terminals 200. Therefore, as the number of the macro terminals 200 is larger, the femto downlink band limitation unit 324 increases a bandwidth where the assignment is limited, of the femto downlink band.

Furthermore, as the propagation loss between the high power base station 100 and the low power base station 300 is larger, the detected macro terminals 200, in other words, the macro terminals 200 around the low power base station 300 are far away from the high power base station 100, then, the low power base station 300 causes interference to the macro terminals 200, so that radio communication between the macro terminals 200 and the high power base station 100 is highly likely to be impossible. Therefore, as the propagation loss between the high power base station 100 and the low power base station 300 is larger, the femto downlink band limitation unit 324 increases the bandwidth where the assignment is limited in the femto downlink band.

Meanwhile, as the number of the femto terminals 400 is larger, a bandwidth of the femto downlink band required for the assignment to the femto terminals 400 becomes larger. Therefore, as the number of the femto terminals 400 is larger, the femto downlink band limitation unit 324 reduces the bandwidth where the assignment is limited in the femto downlink band.

The femto downlink band limitation unit 324, for example, stops the assignment of six continuous resource blocks 1 to 6 among the 50 resource blocks 1 to 50 shown in FIG. 3.

Figure 4:
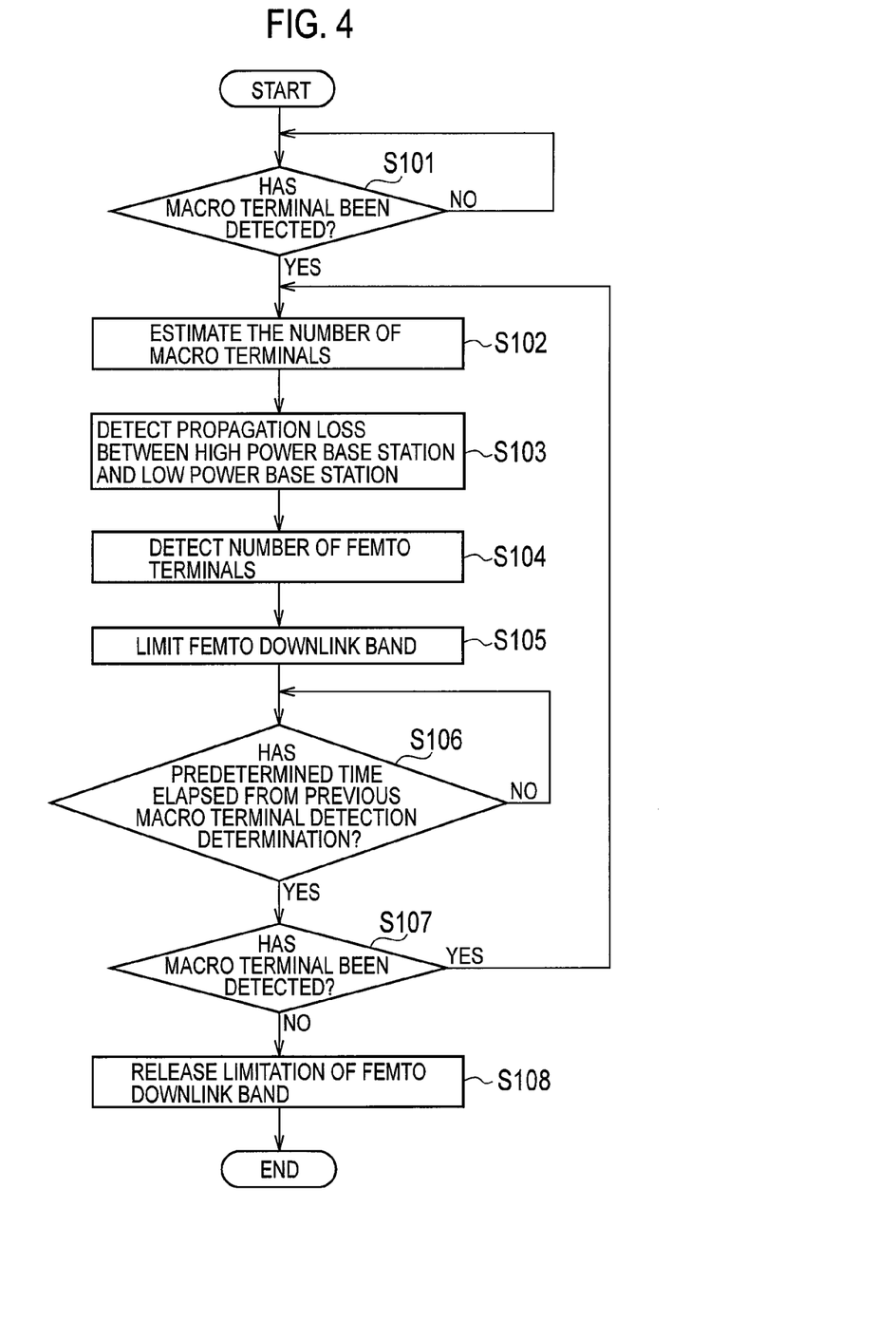
FIG. 4 is a flowchart showing an operation example of the low power base station according to the embodiment of the present invention.

After the assignment of the femto downlink band is limited, the macro terminal detection unit 321 attempts to detect the macro terminals 200 in a predetermined time period. When it is not possible to detect the macro terminals 200, the femto downlink band limitation unit 324 releases the limitation of the (2) Operation of Low Power Base Station Next, the operation of the low power base station 300 will be described. FIG. 4 is a flowchart showing an operation example of the low power base station 300 according to the embodiment of the present invention.

In step S101, the macro terminal detection unit 321 of the control unit 320 determines whether the macro terminals 200 have been detected. When the macro terminals 200 have been detected, the macro terminal detection unit 321 estimates the number of the macro terminals 200 in step S102.

In step S103, the propagation loss detection unit 322 of the control unit 320 detects propagation loss between the high power base station 100 and the low power base station 300.

In step S104, the femto terminal detection unit 323 of the control unit 320 detects the number of the femto terminals 400.

In step S105, the femto downlink band limitation unit 324 of the control unit 320 limits the femto downlink band, which is to be assigned to the femto terminals 400, based on the number of the macro terminals 200 detected by the macro terminal detection unit 321, the propagation loss between the high power base station 100 and the low power base station 300 detected by the propagation loss detection unit 322, and the number of the femto terminals 400 detected by the femto terminal detection unit 323.

In step S106, the macro terminal detection unit 321 determines whether a predetermined time has elapsed from the previous determination of the detection of the macro terminals 200. When the predetermined time has elapsed from the previous determination regarding the detection of the macro terminals 200, the macro terminal detection unit 321 determines again whether the macro terminals 200 have been detected, in step S107.

When the macro terminals 200 have been detected in the step S107, the operations after the estimation of the number of the macro terminals 200 in the step S102 are repeated.

Meanwhile, when the macro terminals 200 have not been detected in the step S107, the femto downlink band limitation unit 324 releases the limitation of the femto downlink band assigned to the femto terminals 400 in step S108.

(3) Operation and Effect

When the macro terminals 200 serving as radio terminals not subordinate to the low power base station 300 have been detected, if the macro terminals 200 exist around the low power base station 300 and the femto downlink band is assigned, as is, to the femto terminals 400 serving as radio terminals subordinate to the low power base station 300, the low power base station 300 according to the present embodiment regards that the macro terminals 200 are interfered and limits the assigned femto downlink band. Consequently, it is possible to appropriately reduce interference to the macro terminals 200 from the low power base station 300.

Furthermore, as the number of the detected macro terminals 200 is larger, it becomes more possible that the low power base station 300 causes interference to the macro terminals 200. In this regard, as the number of the detected macro terminals 200 is larger, the low power base station 300 increases a bandwidth where the assignment is limited.

Furthermore, as propagation loss between the high power base station 100 and the low power base station 300 is larger, the detected macro terminals 200 are far away from the high power base station 100, then, the low power base station 300 causes interference to the macro terminals 200, so that radio communication between the macro terminals 200 and the high power base station 100 is highly likely to be impossible. In this regard, as the propagation loss between the high power base station 100 and the low power base station 300 is larger, the low power base station 300 increases the bandwidth where the assignment is limited.

Furthermore, as the number of the femto terminals 400 is larger, a bandwidth of the femto downlink band required for the assignment to the femto terminals 400 becomes larger. In this regard, as the number of the femto terminals 400 is larger, the low power base station 300 reduces the bandwidth where the assignment is limited.

As described above, the low power base station 300 adjusts the bandwidth where the assignment is limited based on the number of the detected macro terminals 200, the propagation loss between the high power base station 100 and the low power base station 300, and the number of the femto terminals 400, thereby appropriately reducing interference to the macro terminals 200 while preventing the bandwidth where the assignment is limited from being increased more than necessary.

(4) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

In the embodiment, there has been described a case in which the high power base station 100 is a macro cell base station that forms a macro cell and the low power base station 300 is a femto cell base station that forms a femto cell. However, the high power base station 100 and the low power base station 300 are not limited thereto. That is, it is sufficient if the transmission power of the low power base station 300 is smaller than that of the high power base station 100. For example, when the high power base station 100 is a macro cell base station that forms a macro cell, the low power base station 300 may be a base station that forms a micro cell or a pico cell. Furthermore, when the high power base station 100 is a micro cell base station that forms a micro cell, the low power base station 300 may be a base station that forms a pico cell or a femto cell. Moreover, when the high power base station 100 is a pico cell base station that forms a pico cell, the low power base station 300 may be a base station that forms a femto cell.

Furthermore, in the embodiment, the radio communication system 1 has a configuration based on the LTE Release 9 or the LTE-Advanced. However, a configurations based on another communication standard may also be adopted.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-030424 (filed on Feb. 15, 2010) is incorporated in the present specification by reference.

INDUSTRIAL APPLICABILITY

The low power base station and the communication control method of the present invention can appropriately reduce interference to a radio terminal subordinate to a high power base station, and are useful as a low power base station and a communication control method.

The invention claimed is:

1. A low power base station, which configures a radio communication system together with a high power base station and has transmission power smaller than the high power base station, comprising:
a controller configured to detect radio terminals not subordinate to the low power base station on the basis of a radio signal from the radio terminals not subordinate to the low power base station, and to limit a downlink frequency band to be assigned to radio terminals subordinate to the low power base station when the radio terminals not subordinate to the low power base station have been detected, wherein the controller increases the bandwidth where the assignment is limited, as the number of the detected radio terminals not subordinate to the low power base station increases.

2. The low power base station according to claim 1, wherein the controller adjusts the bandwidth where the assignment is limited, according to the number of the radio terminals subordinate to the low power base station.

3. The low power base station according to claim 1, wherein the controller adjusts the bandwidth where the assignment is limited, based on information indicating propagation loss between the low power base station and the high power base station.

4. The low power base station according to claim 3, wherein the controller increases the bandwidth where the assignment is limited, as propagation loss corresponding to the information indicating the propagation loss increases.

5. A low power base station, which configures a radio communication system together with a high power base station and has transmission power smaller than the high power base station, comprising:

a controller configured to detect radio terminals not subordinate to the low power base station on the basis of a radio signal from the radio terminals not subordinate to the low power base station, and to limit a downlink frequency band to be assigned to radio terminals subordinate to the low power base station when the radio terminals not subordinate to the low power base station have been detected, wherein the controller reduces the bandwidth where the assignment is limited, as the number of the radio terminals subordinate to the low power base station increases.

* * * * *